United States Patent
Muramatsu et al.

[11] Patent Number: 5,815,468
[45] Date of Patent: Sep. 29, 1998

[54] DUAL PLAYER AUTOMOTIVE AUDIO SYSTEM CAPABLE OF PLAYING BACK TWO DIFFERENT TYPES OF RECORDING MEDIUMS

[75] Inventors: Hidenori Muramatsu; Hiroyuki Umezawa; Mitsuharu Nakai; Akira Kojima, all of Tokyo, Japan

[73] Assignee: Clarion Co., Ltd., Toda, Japan

[21] Appl. No.: 816,190

[22] Filed: Mar. 12, 1997

[30] Foreign Application Priority Data

Mar. 12, 1996 [JP] Japan .................................. 8-055158

[51] Int. Cl.⁶ ...................................................... H04B 1/20
[52] U.S. Cl. .................................................. 369/2; 369/12
[58] Field of Search .................................. 369/2, 6, 7, 10, 369/11, 12, 75.1; 455/345, 346, 347, 348, 349, 351

[56] References Cited

U.S. PATENT DOCUMENTS 5,020,151  5/1991  Sampei et al. .......................... 455/345
5,177,730  1/1993  Utsugi ..................................... 369/75.1
5,185,804  2/1993  Watanabe ................................ 455/345
5,341,434  8/1994  Kawamoto ............................... 455/345
5,705,976  1/1998  Howard ................................... 455/345

FOREIGN PATENT DOCUMENTS 563374  12/1993  Japan .

*Primary Examiner*—Tan Dinh
*Attorney, Agent, or Firm*—Price, Gess & Ubell

[57] ABSTRACT

An automotive data device, such as an audio player, for playing recording media of a different size includes a housing member housing a first player unit and a second player unit in a stacked arrangement. Each of the player units have insertion slots. A movable operating panel for controlling the respective first player unit and the second player unit extends across the respective insertion slots. A control unit can drive the movable operating panel in a first mode of operation to expose only the first insertion slot, while maintaining the operability of user controls on the operating panel. The control unit provides a second mode of operation to expose both of the insertion slots, while retracting at least a portion of the operating panel into the housing member below the lower insertion slot.

14 Claims, 11 Drawing Sheets

DUAL PLAYER AUTOMOTIVE AUDIO SYSTEM CAPABLE OF PLAYING BACK TWO DIFFERENT TYPES OF RECORDING MEDIUMS

BACKGROUND OF THE INVENTION

1. Field of the Invention

The present invention concerns an automotive data device, such as an audio system, into which a plurality of recording and playback devices are integrally incorporated, and in particular it relates to an automotive data device wherein the device main unit is configured by vertically stacking recording and playback devices used for relatively thin data recording media, such as CDs, MDs and IC cards, together with recording and playback devices used for relatively thick data recording media, such as compact cassette tapes, DATs and video tapes, and other such devices, the front of this device main unit being covered by a front panel that can be opened and closed.

2. Description of Related Art

One type of conventional automotive data device that incorporates a recording and playback device used for a fixed type of data recording media is one wherein a recording and playback device is provided inside the device main unit, the media insertion slot of this recording and playback device is formed in the front of the device main unit, and a front panel that covers the media insertion slot is provided at the front of this device main unit, and it is configured so that the media insertion slot is opened and closed by swivelling this front panel.

On the other hand, with the diversification of data recording media in recent years, there is a demand for automotive data devices for mounting in vehicles that deal with a plurality of data recording media, and thus various types of automotive data devices that incorporate two appropriately selected recording and playback devices into the device main unit have recently been proposed and implemented. Although the exterior dimensions of automotive data devices are generally laid down according to DIN specifications, it is for example possible to provide two recording and playback devices at the top and bottom of the device main unit as shown in FIG. 13, since the 2 DIN specifications have dimensional leeway, particularly in the vertical direction.

In this case, FIG. 13 shows a typical example wherein a CD player 20 for disks (CDs) is provided at the top, and a cassette tape player 30 for cassettes (C cassette tapes) is provided at the bottom of device main unit 10. Front panel 40 is provided at the front of this device main unit 10, and simultaneously covers the media insertion slot 21 of CD player 20 and the media insertion slot 31 of cassette tape player 30. A display such as liquid crystal display 41 and user operating switches or controls are provided at the front part of this front panel 40.

To release each of the media insertion slots 21 and 31 of CD player 20 and cassette tape player 30 by swivelling this front panel 40, front panel 40 must at least be moved down relative to device main unit 10. That is, if it is configured so that front panel 40 is moved up relative to device main unit 10 and swivelled through 90 degrees or so, since the viewpoint of passengers in the vehicle is higher than the automotive data device, media insertion slots 21 and 31 are obstructed from the viewpoint of passengers in the vehicle by front panel 40 and are difficult to see, even when both media insertion slots 21 and 31 are fully released. To resolve this inconvenience it would be necessary to swivel front panel 40 by as much as 180 degrees or so, but in this case the operating range of front panel 40 becomes very large, which is inconvenient.

It is thus preferable that front panel 40 is swivelled so as to move down relative to device main unit 10. This style of swivelling encompasses the style whereby, as shown in FIG. 14, front panel 40 is simply swivelled with the bottom end of front panel 40 as a swivelling axis (so that its front part points down), and the style shown in FIG. 15 whereby link 40a that supports the bottom end of front panel 40 is pushed out to the front, thereby moving the bottom part of front panel 40 forward and moving the top part of front panel 40 down, and thus front panel 40 swivels with the bottom end of front panel 40 as a swivelling axis (so that its front part points up).

However, as shown in FIG. 14 and FIG. 15, in a conventional automotive data device provided with two recording and playback devices at the top and bottom of the device main unit and provided with a swivelling style of front panel at the front of this device main unit, there are the following problems. That is, when ejecting and inserting (loading) disk 2 or cassette 3, which are the data recording media for CD player 20 and cassette tape player 30, it is necessary to swivel front panel 40 through about 90 degrees.

In this case, in the style of FIG. 14, when front panel 40 is swivelled so that its front part faces down, the results of swivelling front panel 40 through about 90 degrees is that the front part of front panel 40 becomes completely impossible for the passengers of the vehicle to see. In this state, it is difficult to view or operate displays such as liquid crystal display 41 and operating switches provided on the front part of front panel 40, making it awkward to use and difficult to operate.

On the other hand, in the style of FIG. 15, when front panel 40 is swivelled so that its front part faces up, since the front part of front panel 40 comes close to the media insertion slot 31 of the lower cassette tape player 30, cassette 3 and the front part of front panel 40 come very close together when ejecting or loading cassette 3, and are liable to come into contact. In this case, it is possible that the display such as liquid crystal TV 41 and operating switches provided on the front part of front panel 40 wll be damaged. Also, when a disk player such as CD player 20 is provided at the bottom of device main unit 10, the signal recording surface of the disk may become damaged.

Furthermore, in a conventional automotive data device provided in this way with a plurality of recording and playback devices at the top and bottom of the device main unit, it is necessary to swivel front panel 40 through a large angle of 90 degrees or so every time a data recording media is ejected or loaded as mentioned above. The fact that front panel 40 is swivelled through a large angle of 90 degrees or so every time a data recording media is ejected or loaded in this way increases the time and effort needed for ejecting and loading operations and makes the device difficult to operate. Also, in an automotive data device provided with a plurality of recording and playback devices, since the dimensions of front panel 40 itself are large, the amount by which this front panel 40 projects from device main unit 10 is considerably large when front panel 40 is swivelled. This large projection of front panel 40 increases the possibility of it interfering with various devices inside the car (such as the gear shift lever) and with the passengers, and this is also undesirable in that inter alia, it leads to limitations on the positions in which the automotive data device can be installed.

OBJECTS AND SUMMARY OF THE INVENTION

The present invention has been proposed in order to resolve the above-mentioned problems of the prior art, and it aims to provide an automotive data device whereby the front part of the front panel can be viewed and operated when ejecting and inserting data recording media, wherein damage to the front panel and to the data recording media can be prevented, and wherein the installable range of the device can be enlarged by decreasing the amount of swivel and the amount of projection of the front panel, and which is highly convenient to use, easy to operate, reliable, and has good positioning flexibility.

To achieve the abovementioned objective, the present invention is an automotive data device characterized in that, in particular, it is configured so that the front panel is swivelled in two directions and respectively releases the media insertion slots by swivelling in both these directions, and in that it is configured so that this swivelling of the front panel is controlled according to instructions for attachment and removal issued to the recording and playback means.

First, the automotive data device according to the invention, like a conventional automotive data device, is equipped with a device main unit, a plurality of recording and playback means provided vertically stacked inside this device main unit, and a plurality of media insertion slots provided for each of these plurality of recording and playback means, and which are respectively formed at the front of device main unit. Furthermore, the front of device main unit is equipped with a front panel provided so as to cover a plurality of media insertion slots, and a swivel means that swivels this front panel so that this front panel releases the plurality of media insertion slots. The automotive data device according to the present invention is also characterized in that, in an automotive data device with this configuration, it furthermore has the following configuration.

A swivel means is configured with a motor and linkage system so as to swivel the front panel in two directions so that its front part points both up and down, and in that it is provided with a control means that controls the starting and stopping of this swivel means. In this case, the swivel means is configured so as to swivel the front panel in a first direction in which its front part points up, and in a second direction in which its front part points down, respectively.

The control means is further configured so that when instructions for the attachment/removal of media are issued to a recording and playback means at the top of the plurality of recording and playback means, the front panel is swivelled in said first direction by starting said swivel means. This control means is also configured so that when instructions for the attachment/removal of media are issued to a recording and playback means at the bottom of said plurality of recording and playback means, the said front panel is made to swivel in said second direction by starting said swivel means.

When ejecting inserting data recording media from a recording and playback means (recording and playback device), the swivel means is started by the control means according to an instruction to attach or remove media to/from this recording and playback device, whereby the front panel automatically swivels in the first or second direction, and thus passengers of the vehicle can eject and insert data recording media easily without having to swivel the front panel.

In particular, when resetting or inserting data recording media from a recording and playback device at the top, the front panel swivels in the first direction and its front part points up, and thus the passengers of the vehicle can continue to view and operate displays such as the liquid crystal TV and operating switches provided at the front part of this front panel, in the same way as before swivelling.

On the other hand, when ejecting or inserting a data recording media from/into a recording and playback device at the bottom, the front panel swivels in the second direction and its front part points down, so that there is no possibility of the data recording media touching the front part of the front panel. Accordingly, there is no danger of damaging the operating switches and displays such as a liquid crystal TV provided on the front part of the front panel, and there is no danger of damaging the data recording surface of a disk even when a disk player such as a CD player is provided as the lower recording and playback device.

Thus, by automatically switching the swivel direction of the front panel according to the position of the media insertion slot to/from which the data recording media is to be attached/removed, it is possible to view and operate the front part of the front panel when ejecting and inserting data recording media, and it is possible to prevent damage to the front panel and the data recording media, to a greater extent than in the case where the swivel direction of the front panel is always in the same direction when attaching and removing data recording media. Accordingly, it can be made more convenient to use, easier to operate, and more reliable.

The swivel means is configured so that, so that when swivelling said front panel in said first direction, the top end of this front panel is pulled down below at least one media insertion slot of the plurality of media insertion slots, and to a position above at least one media insertion slot. This swivel means is also configured so that, when swivelling this front panel in second direction, the back part of this front panel is dropped to a position below the lowermost media insertion slot of the said plurality of media insertion slots.

When ejecting or inserting a data recording media from to a recording and playback device at the top, the front panel is only swivelled by the minimum amount necessary to release the media insertion slot of this top recording and playback device, and thus compared to the case where all the media insertion slots are released, it is possible to reduce the amount by which the front panel is swivelled and the amount by which it projects. As a result, in addition to being able to shorten the time required for ejecting and inserting data recording media, it is also possible to prevent damage to the front panel, and the installable range of the device is also increased. Accordingly, it is possible to increase its convenience of use, its ease of operation and its reliability, and it also has excellent positioning flexibility.

The control means is configured so as to hold said front panel in the swivelled state in said second direction without starting said swivel means when an instruction for the attachment/removal of media is issued to a recording and playback means at the top of said plurality of recording playback means that is in a state where said front panel is swivelled in said second direction.

Ejecting or inserting data recording media from to a recording and playback device at the top, the media insertion slot of the recording and playback device at the top is usually released by swivelling the front panel in the first direction, but in the case where the front panel is swivelled in the second direction and all the media insertion slots in a released state, there is no point in swivelling the front panel in the opposite direction from this state. Conversely, it is possible to eject and insert data recording media with from/into the upper recording and playback device both quickly and effectively with the front panel left rotated in the second direction without unnecessary swivelling.

Accordingly, it is possible to further enhance the convenience of use and ease of operation.

Since a disk player that is used for disks—which are relatively thin data recording media is situated at the top, it is possible to reduce the amount of swivel and the amount of projection in the state where the front panel is swivelled in the first direction to release the media insertion slot of this disk player. As a result, it is not only possible to shorten the time required for disk ejecting and insertion, but it is also possible to prevent damage to the front panel and to enlarge the installable range of the device. Accordingly, it is possible to further enhance the convenience of use, the ease of operation, and the reliability, and it also has excellent positioning flexibility.

That is, when ejecting a small-diameter disk from media insertion slot, since the amount by which this small-diameter disk projects is small, it is generally difficult to take the disk out. In particular, when the disk player is situated at the top, in the state where the front panel is swivelled in the first direction to release the media insertion slot of this disk player, since this media insertion slot is extremely close to the top end of the front panel, it is made even more difficult to take out the small-diameter disk. Conversely, the front panel is swivelled in the second direction when ejecting the small-diameter disk, making it easier to take out the small-diameter disk since it is adequately separated from the media insertion slot of the disk player, and it is possible to further enhance the convenience of use and ease of operation.

The swivel means is configured so as to retract the bottom part of this front panel inside said device main unit when said front panel is swivelled in said second direction. That is, when the front panel is swivelled in the second direction, from the relationship whereby all the media insertion slots are released, the amount by which the front panel swivels is increased and, concomitant with this, the amount of projection of the front panel also increases. Conversely, when the front panel is swivelled in the second direction, it is possible to reduce the amount of projection of the front panel in the state where it is swivelled in the second direction by retracting the bottom part of the front panel inside the device main unit. As a result, it is not only possible to prevent damage to the front panel, but it is also possible to increase the installable range of the device. Accordingly, it is possible to further increase the convenience of use, ease of operation and reliability, and the flexibility of positioning is also enhanced.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 7 is a side view showing the second open state of the panel drive unit of FIG. 5;

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved automotive data device, such as an audio player that can reproduce sound from different formats of recording media.

Figure 16:
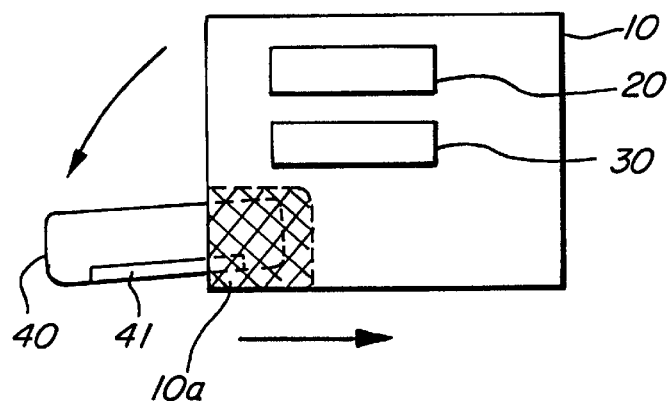
FIG. 16 is an explanatory diagram showing the dead space formed at the end part of the device main unit by applying the present invention.

Incidentally, it is necessary to provide a dead space for retraction purposes at the front of the device main unit in order to configure it so that the front panel can be retracted inside the device main unit. In this case, as shown in FIG. 16, since the bottom part of front panel 40 (which includes an axis for swivelling in the second direction) is retracted, it is sufficient to provide dead space 10 conformant with the amount of retraction in just one part at the lower front part of device main unit 10, and thus it does not limit the configuration of housing.

Figure 17:
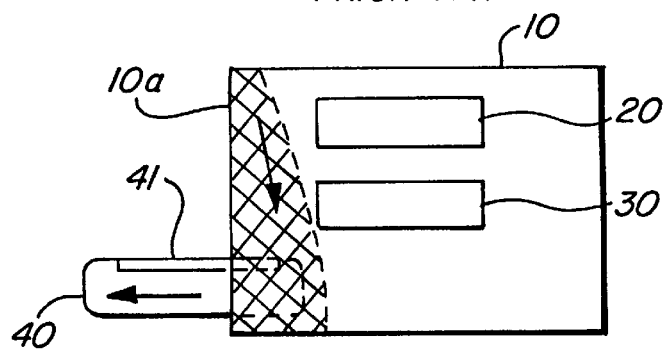
FIG. 17 is an explanatory diagram showing the dead space formed at the end part of the device main unit in one example of a swivel method differing from the present invention.
Figure 18:
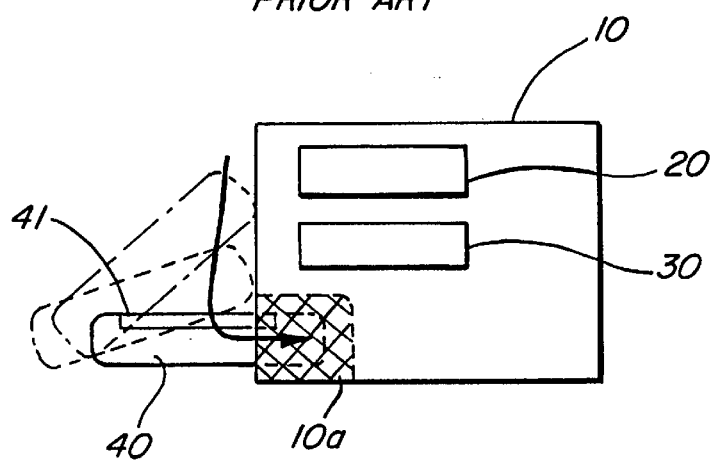
FIG. 18 is an explanatory diagram showing the dead space formed at the end part of the device main unit in another example of a swivel method differing from the present invention.

On the other hand, when the front panel is swivelled in the first direction, a configuration whereby the top part of this front panel is retracted inside the device main unit can also be considered. However, in this case, from the relationship whereby the top part of the front panel is moved down, a large dead space 10a has to be provided pointing down from the top part of device main unit 10, as shown in FIG. 17. Also, when retraction dead space 10a at the bottom is used unaltered as shown in FIG. 16, the amount of projection of front panel 40 becomes very large when front panel 40 is moved down as shown by the dotted line in FIG. 18. In particular, when the front panel is swivelled in the first direction, since it only has to swivel by the amount needed to release the previously set upper media insertion slot, it is possible to substantially reduce the amount of swivel and the amount of projection of the front panel compared with the case where it is swivelled in the second direction to release all the media insertion slots. Therefore, even supposing it is configured so as to retract the top part of this front panel inside the device main unit when swivelling in the first direction, this is inconvenient in that a large amount of dead space is required to retract the front panel, and the operational effect of the case where the bottom part is retracted when swivelling in the second direction is not obtained.

Figure 1:
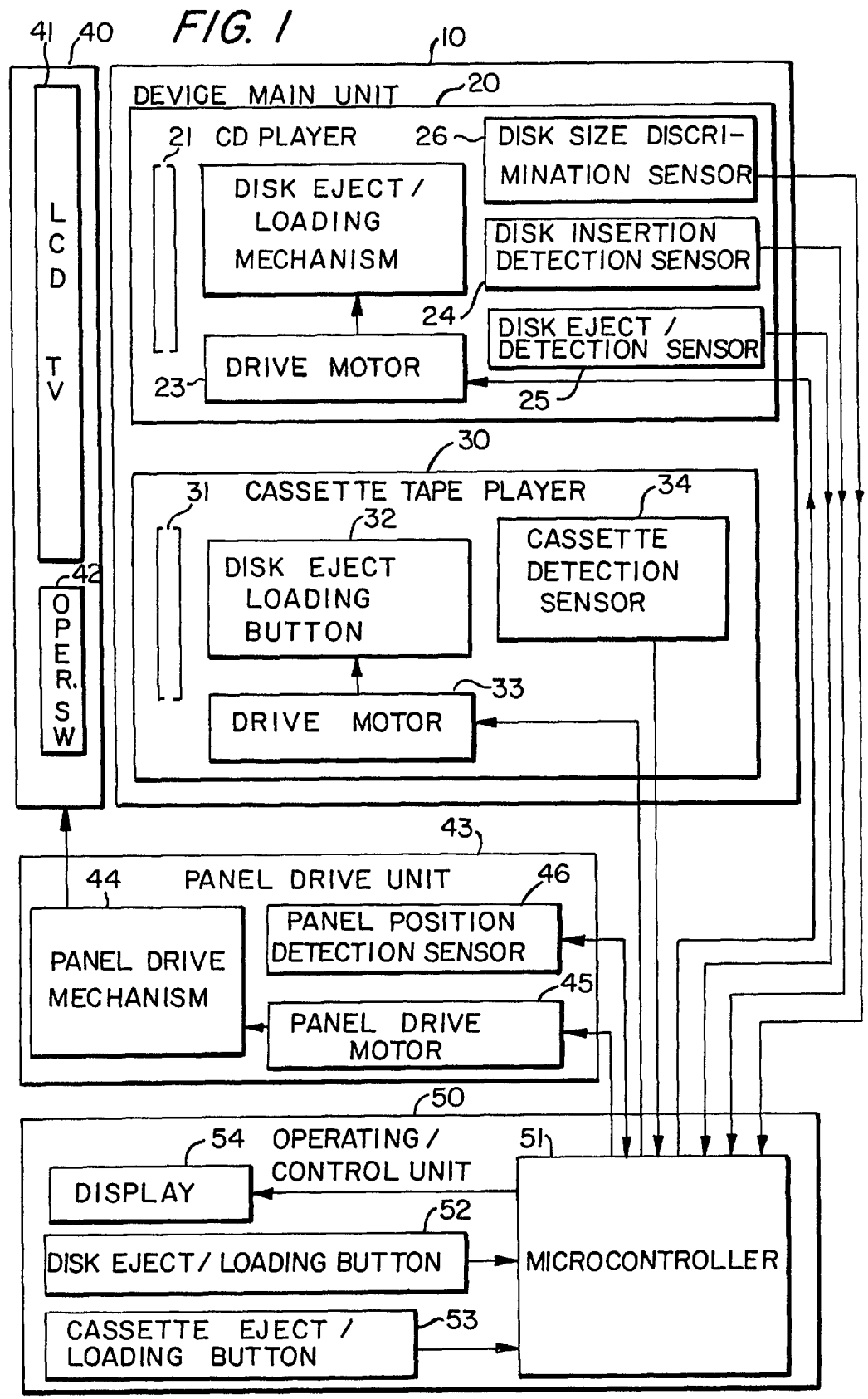
FIG. 1 is a block diagram showing the configuration of an automotive data device according to a first embodiment of the present invention.
Figure 2:
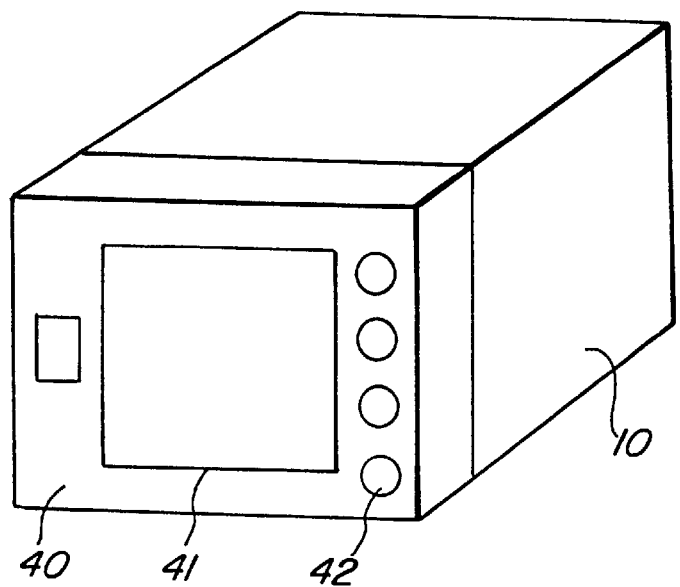
FIG. 2 is an oblique view showing the closed state of the panel drive unit in FIG. 1.
Figure 3:
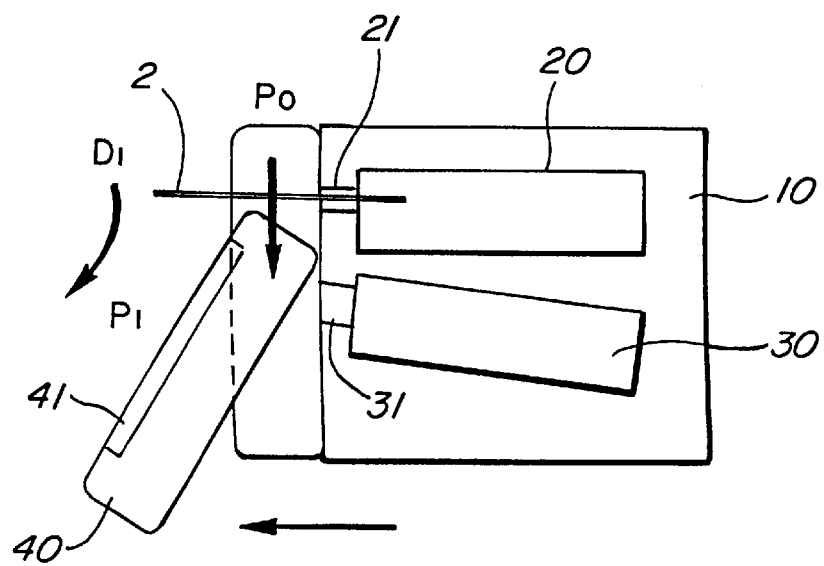
FIG. 3 is a side view showing the first open state of the panel drive unit in FIG. 1.
Figure 4:
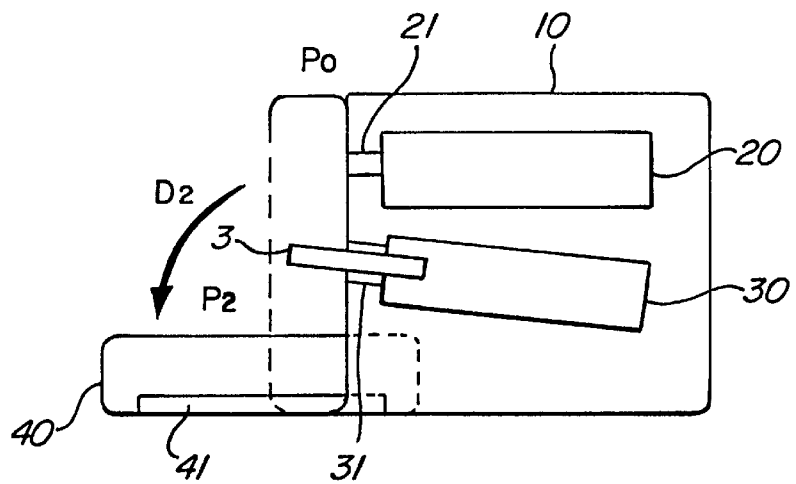
FIG. 4 is a side view showing the second open state of the panel drive unit in FIG. 1.
Figure 5:
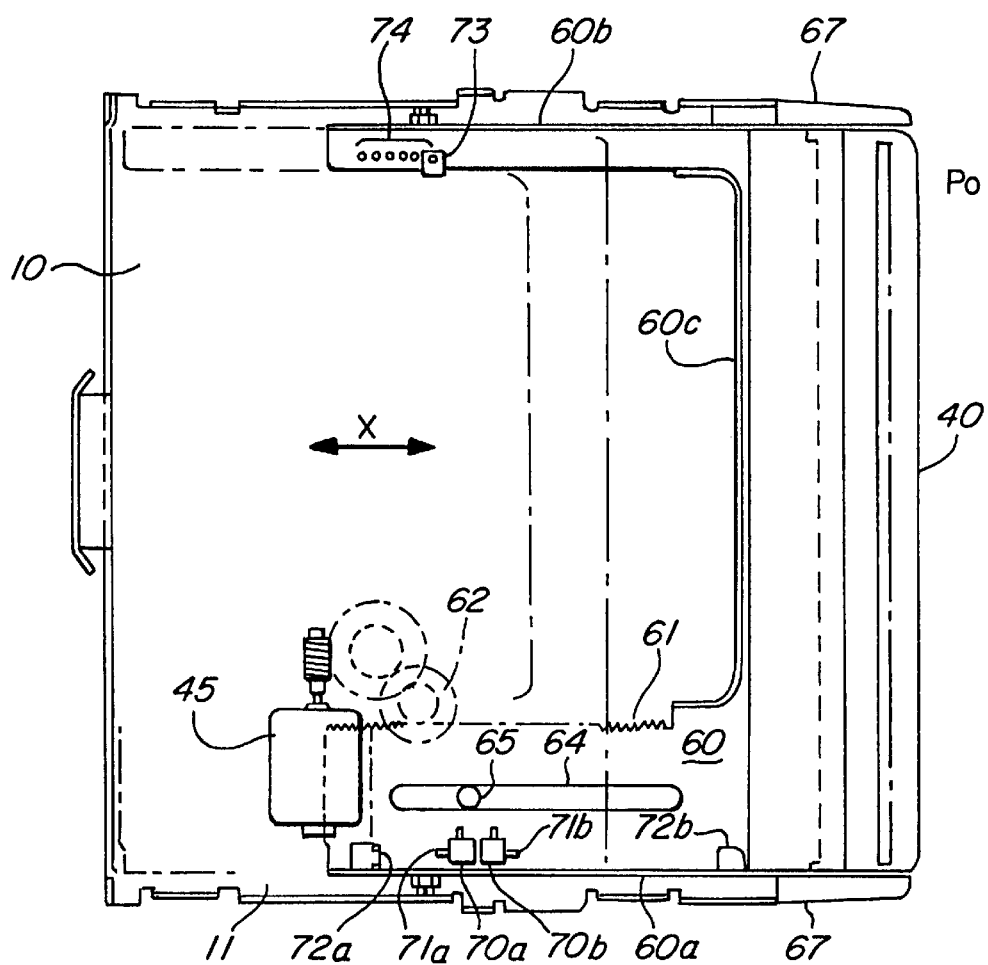
FIG. 5 is a figure showing a specific example of the panel drive unit in FIG. 1; in particular, a plan view showing the closed state.
Figure 6:
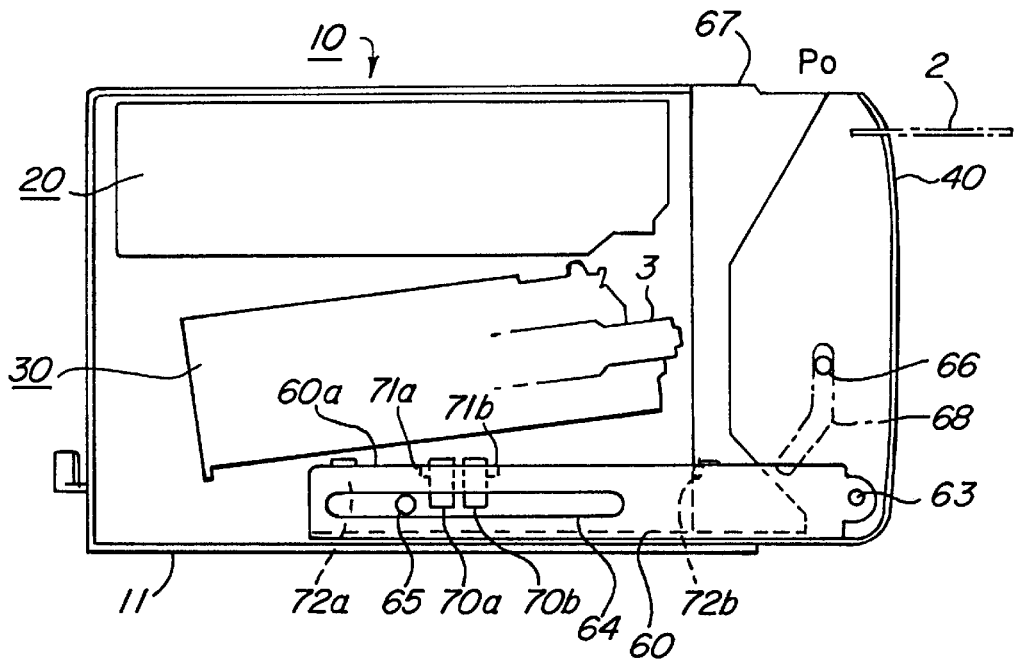
FIG. 6 is a side view of FIG. 5.
Figure 7:
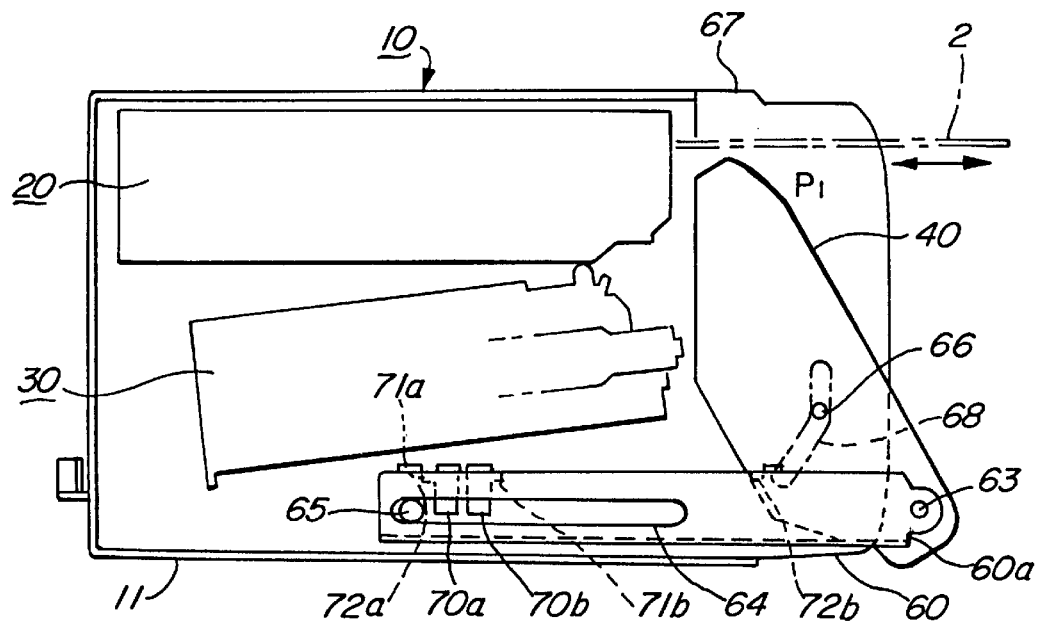
FIG. 7 is a side view showing the first open state of the panel drive unit of FIG. 5.
Figure 8:
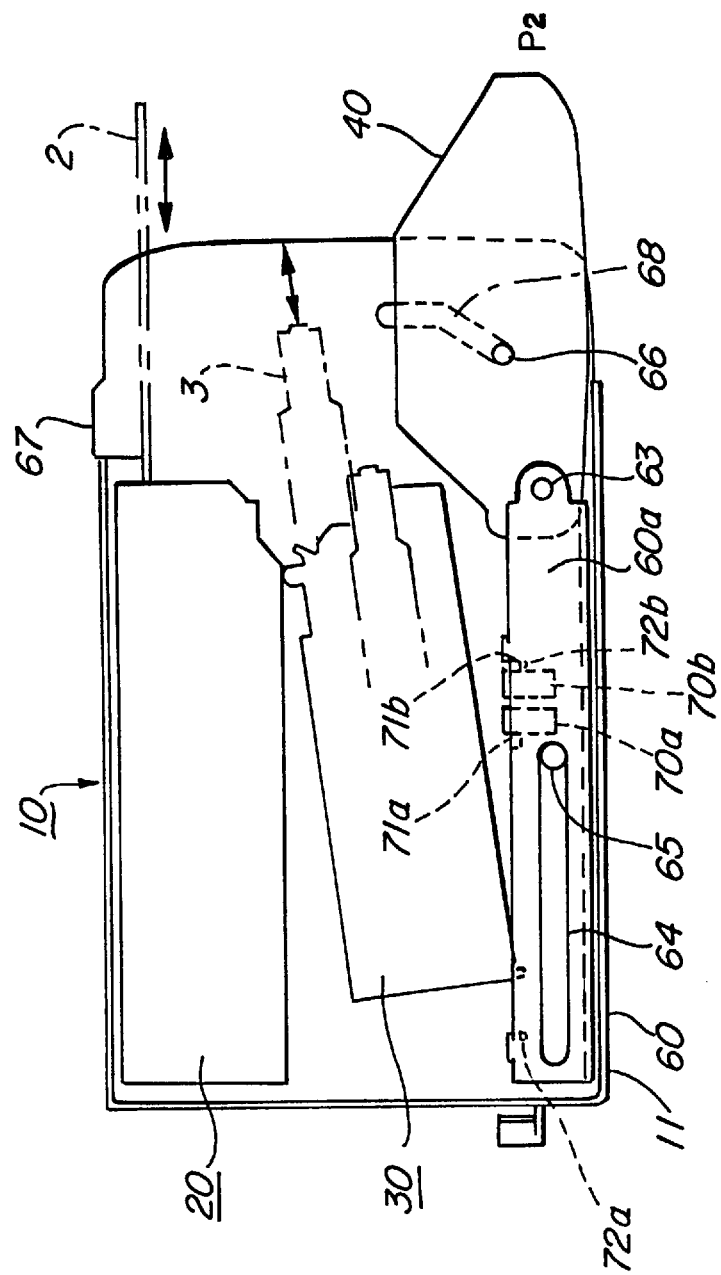
Figure 9:
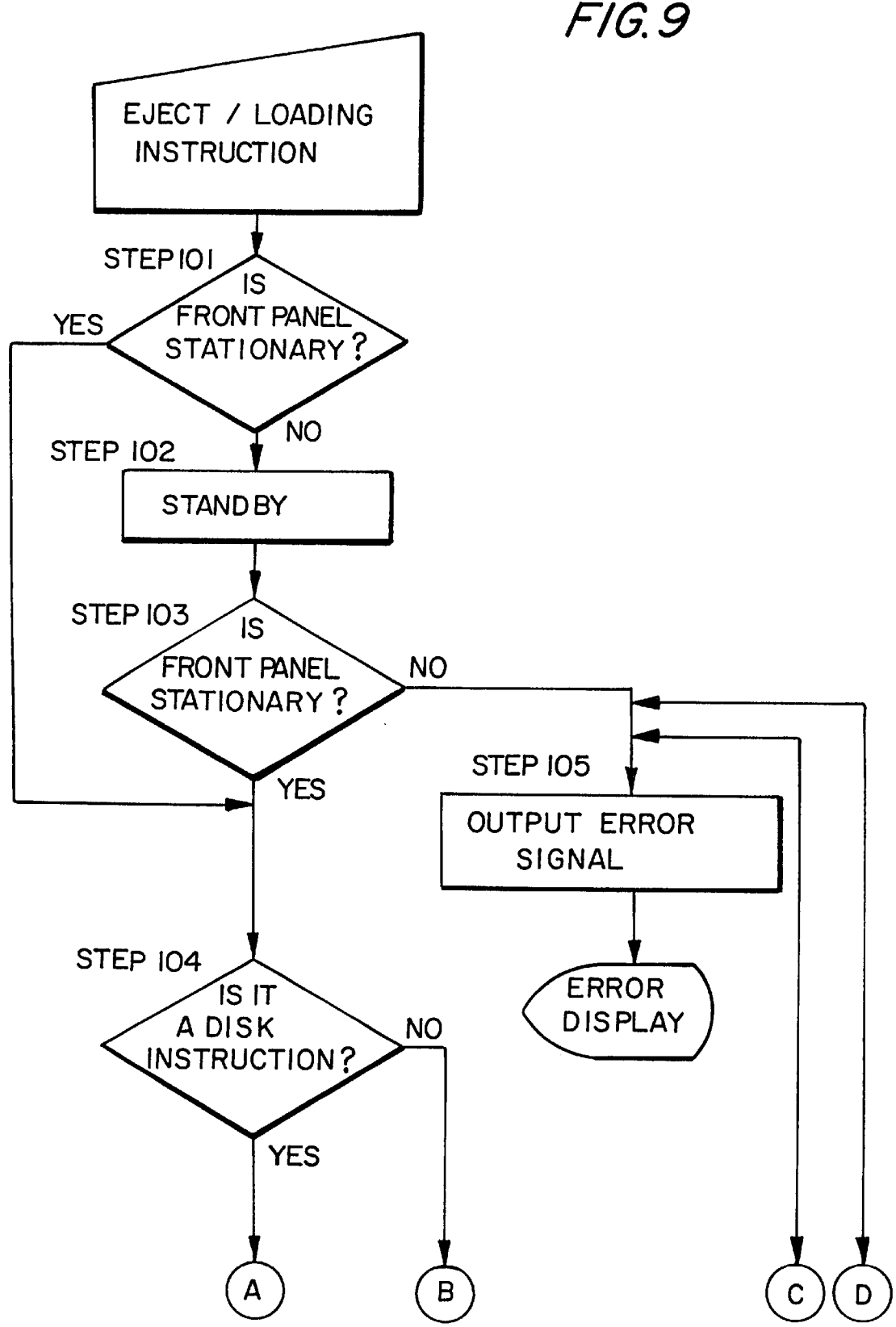
FIG. 9 is a flow chart showing the operating procedure of the microcontroller when an eject/loading instruction is received, showing the portion until recognition of the instruction signal.
Figure 10:
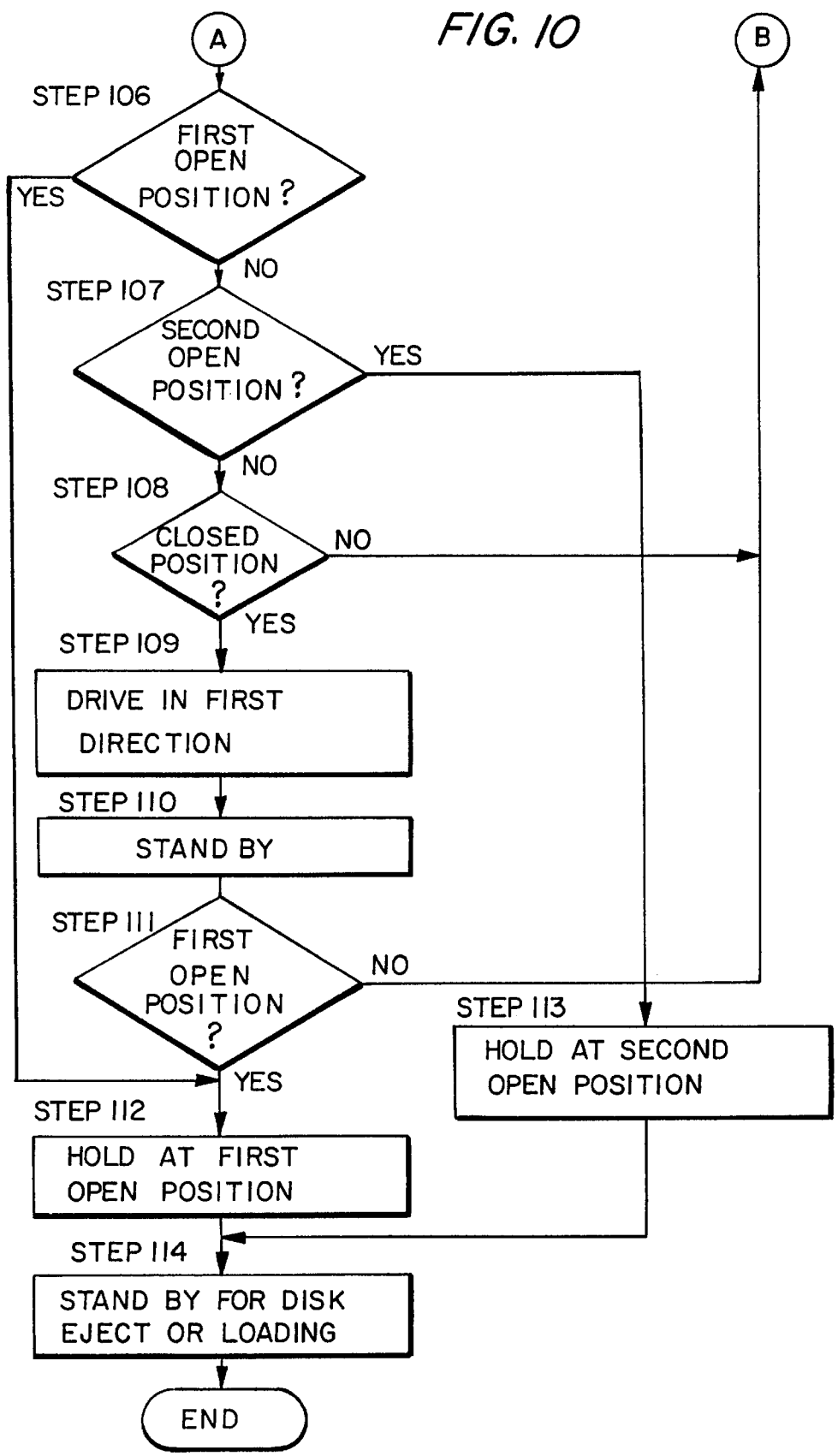
FIG. 10 is a flow chart showing the portion relating to control of the front panel for the CD player and control of the CD player in the operating procedure of the microcontroller when an eject/loading instruction is received in the device of FIG. 1.
Figure 11:
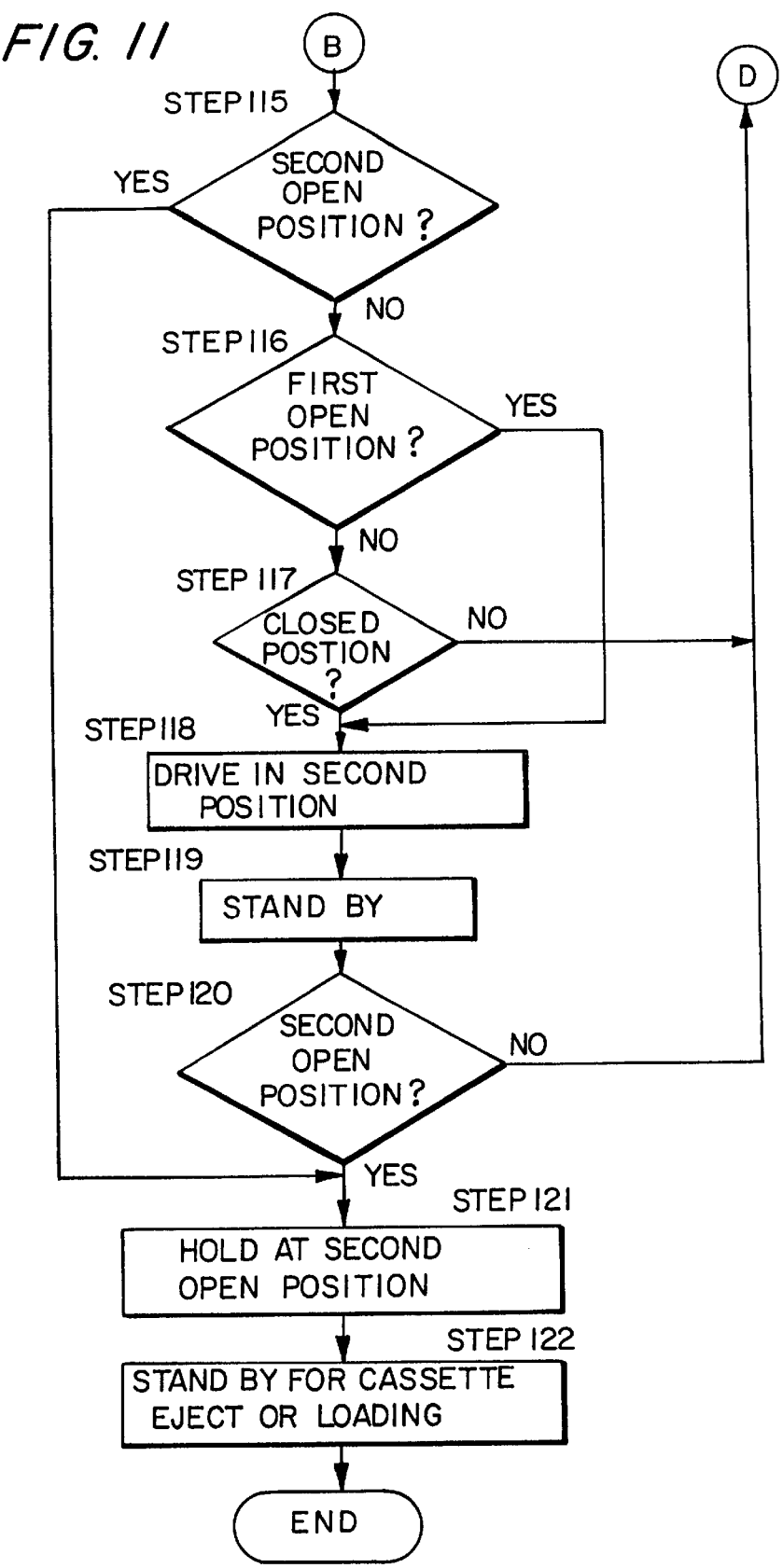
FIG. 11 is a flow chart of the operating procedure of the microcontroller in the device of FIG. 1 when eject/loading instruction is received, showing the portion relating to control of the front panel for the cassette tape player and control of the cassette tape player.

As a first embodiment of the present invention, a specific embodiment is described as applied to an automotive data device provided with a CD player at the top of the device main unit, and a cassette tape player for compact (C) cassettes at the bottom with reference to FIGS. 1 through 9. Here, FIG. 1 is a block diagram schematically illustrating the overall configuration of the automotive data device in the form of an audio player unit according to the present embodiment, FIGS. 2 through 4 show the three typical states of the panel drive unit of the device of FIG. 1, where FIG. 2 is an oblique view of the closed state, FIG. 3 is a side view of the first open state, and FIG. 4 is a side view of the second open state. Also, FIGS. 5 through 8 show an example of the specific configuration of the panel drive unit of the device, where FIG. 5 is a plan view of the closed state, FIG. 6 is a side view of the closed state, FIG. 7 is a side view of the first open state, and FIG. 8 is a side view of the second open state. Furthermore, FIGS. 9 through 11 are flow charts showing the operating procedure of the microcontroller during eject and loading instructions in the device, where FIG. 9 is the portion from the input of instructions to their discrimination, FIG. 10 is the portion relating to CD player control and front panel control for the CD player, and FIG. 11 is the portion relating to cassette tape player control and front panel control for the cassette tape player.

As shown in FIG. 1, CD player 20 for disks (CDs) and cassette tape player 30 for cassettes (C cassette tapes) are provided, vertically stacked inside device main unit 10, in the automotive data device according to the present embodiment. Each of the media insertion slots 21 and 31 of this CD player 20 and cassette tape player 30 are respectively formed in the front of device main unit 10. Front panel 40, which simultaneously covers the media insertion slots 21 and 31 of CD player 20 and cassette tape player 30, is provided at the front of this device main unit 10, and a liquid crystal display 41 and operating switches 42 thereof (see FIG. 2) are provided at the front part of this front panel 40.

Here, CD player 20 is a player that can directly load both large-diameter disks (12 cm CDs) and small-diameter disks (8 cm CDs); such players are widely known. Also, this CD player 20 is equipped with disk eject/loading mechanism 22 for ejecting and loading disk 2, and drive motor 23 for driving this disk eject/loading mechanism 22. CD player 20 is also equipped with disk insertion detection sensor 24 for detecting the insertion of disk 2, disk eject detection sensor 25 for detecting the ejection of disk 2, and disk size discrimination sensor 26 for discriminating the size of disk 2. These sensors 24 through 26 can be appropriately designed using existing technology, such as light sensors and microswitches.

Next, cassette tape player 30 is situated with a slight inclination from front to back so that its media insertion slot 31 is positioned higher up than it would be in the horizontal case, so as to reduce the amount of swivel of front panel 40. This cassette tape player 30 is equipped with cassette eject/loading mechanism 32 for ejecting and loading cassette 3, and drive motor 33 for driving this cassette eject/loading mechanism. Cassette tape player 30 is also equipped with cassette detection sensor 34 for detecting the section and insertion of cassette 3. Like the sensors 24 through 26, this sensor 34 uses existing technology.

Also, in the present embodiment, panel drive unit 43 for driving front panel 40 is provided in this front panel 40, and this panel drive unit 43 is equipped with panel drive mechanism 44 for swivelling front panel 40 in two directions, and panel drive motor 45 for driving this front panel mechanism 44. Here, panel drive mechanism 44 is configured so as to assume a first open position $P_1$ shown in FIG. 3 by swivelling front panel 40 in first direction $D_1$ from closed position $P_0$ shown in FIG. 2, and second open position $P_2$ shown in FIG. 4 by swivelling in a second direction $D_2$, and is also configured to return front panel 40 to a closed position $P_0$ from first or second open position $P_1$ or $P_2$.

Here, closed position $P_0$ of front panel 40 is a vertical position that blocks the media insertion slots 21 and 31 of CD player 20 and cassette tape player 30. Also, first open position $P_1$ is an upwardly inclined position that only releases media insertion slot 21 of CD player 20 while covering media insertion slot 31 of cassette tape player 30, the angle of this inclination being adjustable between closed position $P_0$ and the limit of the swivel range in first direction $D_1$. Furthermore, second open position $P_2$ is a horizontal position wherein the media insertion slots 21 and 31 of CD player 20 and cassette tape player 30 are both released, and coincides with the limit of the swivel range in second direction $D_2$.

Furthermore panel chive unit 43 is equipped with panel position detection sensor 46 that detects the position of front panel 40. The position of front panel 40 can be detected by this panel position detection sensor 46 using suitable existing technology. For example, it can easily be done using a configuration whereby the operating position of panel drive mechanism 44 is detected by panel position detection sensor 46, and it is also possible to use a configuration whereby the position of a part of front panel 40 is detected by panel position detection sensor 46.

Also, in the present embodiment, device main unit 10 is provided with operating/control unit 50. This operating/control unit 50 is provided with microcontroller 51 as a control means for controlling the device main unit 10, and is also provided with disk eject/loading button 52 and cassette eject/loading button 53 for respectively issuing eject and loading instructions to CD player 20 and cassette tape player 30. Also, display 54 is provided to perform operational display and control display for CD player 20, cassette tape player 30 and panel drive unit 43, and also to display the error when an error is judged to have occurred.

Here, the microcontroller 51 is set up to receive detection signals from each of the sensors 24 through 26 and 34 of CD player 20 and cassette tape player 30, and to control the starting and stopping of each drive motor 23 and 33 according to each instruction signal from disk eject/loading button 52 and cassette eject/loading button 53. The technology whereby microcontroller 51 is used in this way to automatically perform ejection and loading of CD player and cassette tape player 30 is a known technology, but in the present embodiment microcontroller 51 also performs drive control of front panel 40. That is, microcontroller 51 not only identifies the position of front panel 40 by receiving a detection signal from panel position detection sensor 46, but is also set up to control the starting and stopping of panel drive motor 45 according to each instruction signal from disk eject/loading button 52 and cassette ejection/loading button 53.

Although not illustrated for the sake of clarity, note that CD player 20 is actually equipped with various means besides disk eject/loading mechanism 22 in order to replay the data recorded on disk 2, i.e., disk drive and optical pick-up mechanisms, a signal processing device, and so on. Similarly, cassette tape player 30 is provided with various means beside cassette eject/loading mechanism 32 in order to play back the data recorded on C cassette tape 3, i.e., a tape drive, a playback head, a signal processing device, and so on. Similarly, operating/control unit 50 is provided with various displays besides display 54 and various operating buttons besides eject/loading buttons 52 and 53 in order to operate CD player 20 and cassette tape player 30.

Panel drive unit 43 of the automotive data device according to the present embodiment is specifically configured as shown, for example, in FIG. 5 and FIG. 6. As shown in FIG. 5 and FIG. 6, panel drive motor 45 and slide member 60, which is driven by this panel drive motor 45 and swivels front panel 40, are provided at the bottom inside chassis 11 of device main unit 10. This slide member 60 is coupled to panel drive motor 45 by rack 61 provided on a part thereof, via gears 62, and is driven to and fro in a reciprocating fashion in the direction of arrow X in the figure by the forward and reverse drive power of panel drive motor 45.

The periphery of this slide member 60 is folded over so as to confer strength and is formed into ribs 60a, 60b and 60c. The end parts of ribs 60a and 60b on the left and right sides support drive pins 63, which are provided on both sides at the bottom of front panel 40, with freedom to pivot. This slide member 60 is equipped with guide slots 64, of which one extends horizontally to the front and rear in the main body of the slide member and two others are provided in ribs 60a and 60b on either side, and is configured so as to be guided to and fro in the horizontal direction by these guide slots 64 and by guide pins 65 which are inserted into each guide slot 64 and fixed to chassis 1. Accordingly, by driving panel drive motor 45 forward and backward, slide member 60 is made to undergo reciprocal motion toward the front and rear guided by guide slots 64 and guide pins 65 to form a linkage system with the front panel 40, and the bottom part of front panel 40 is made to undergo reciprocal motion forward and backward via drive pins 63.

In the figures, 66 represents follower pins provided at both sides of the central part of front panel 40, and each of the follower pins 66 is supported with freedom to slide inside each guide slot 68 of each guide plate 67 respectively provided at both sides of front panel 40. Here, each guide plate 67 is fixed to the outer casing (not illustrated). Each guide slot 68 is formed into a V shape at the underside of each guide plate 67, the upper parts of guide slots 68 being formed perpendicularly, and the lower parts of guide slots 68 inclined in a shape that slopes down to the rear. These follower pins 66, along with the abovementioned drive pins 63, configure a 4-point support for front panel 40, and front panel 40 is supported at 4 points with respect to device main unit 10.

On the other hand, 70a and 70b in the figures are limit switches provided on chassis 11 as part of panel position detection sensor 46. These limit switches 70a and 70b stop front panel 40 by mechanically detecting the position of front panel 40 via slide member 60, and are thus respectively equipped with actuators 71a and 71b, which mutually project rearward and are provided to respectively define the limits at both sides of the swivel range of front panel 40. Also, at the top end of rib 60a of slide member 60, operating tabs 72a and 72b are respectively provided by folding back at one place to press onto each actuator 71a and 71b.

That is, each limit switch 70a and 70b stops panel drive motor 45 of panel drive unit 43 when actuators 71a and 71b are pressed down by operating tabs 72a and 72b of slide members 60, whereby front panel 40 is stopped. Thus, limit switches 70a and 70b and operating tabs 72a and 72b are situated in a relationship such that limit switch 70a at the rear operates when front panel 40 has reached the limit of the swivel range in first direction $D_1$, and limit switch 70b at the front operates when front panel 40 has arrived at the limit of the swivel range in second direction $D_2$ (second open position $P_2$ in FIG. 8).

Furthermore, 73 in the figures is a photoswitch provided on chassis 11 as a part of panel position detection sensor 46. This photoswitch 73 is provided to optically detect the position of front panel 40 via slide member 6 when this front panel 40 has arrived at closed position $P_0$ shown in FIG. 6 or first open position $P_1$ shown in FIG. 7, and to stop the front panel 40. Also, a perforated line 74 is provided at the back of rib 60b of slide member 60.

That is, photoswitch 73 is made to stop panel drive motor 45 of panel drive unit 43 by detecting perforated line 74 of slide member 60, and thereby stop front panel 40. Photoswitch 73 and perforated line 74 are situated in a relationship such that photoswitch 73 counts the holes in perforated line 74 while front panel 40 is swivelling in first direction $D_1$ from closed position $P_0$ in FIG. 6. In this case, by arbitrarily setting the total number of holes in perforated line 74 at which it is stopped by photoswitch 73, it is possible to set first open position $P_1$ of front panel 40 arbitrarily between the limits of closed position $P_0$ and the limit of the swivel range in first direction $D_1$.

In an automotive data device according to the first embodiment and having the above configuration front panel 40 is controlled during ejecting/loading by microcontroller 51 of control/operating unit 50 according to the procedure shown in FIGS. 9 through 11.

As shown in FIG. 9, either disk eject/loading button 52 or cassette eject/loading button 53 of operating/control unit 50 is operated by a passenger in the vehicle, an eject/loading instruction signal is issued to CD player 20 or cassette tape player 30, and when this instruction signal is input to microcontroller 51, microcontroller 51 begins a control operation of front panel 40 on condition that front panel 40 is stationary.

When an eject/loading instruction signal is input as mentioned above, microcontroller 51 first judges whether or not front panel 40 is stopped (in operation?), shown as step 101 in FIG. 9. At this step 101, when microcontroller 51 has judged that front panel 40 has not stopped, it stands by for a specific time interval according to the required time from when a control signal for driving is output to panel drive unit 43 until when a stationary position detection signal is input. After standing by, microcontroller 51 judges whether or not front panel 40 has stopped (in operation?) at step 103.

At step 103, when front panel 40 has been judged to have stopped, it is considered that the driving of front panel 40 has been appropriately performed. Accordingly, when microcontroller 51 has judged that front panel 40 has stopped at step 101 or step 103, it proceeds to step 104, and at step 104 it determines whether or not the input eject/loading instruction signal is a disk instruction relating to CD player 20 (or whether it is a cassette instruction relating to cassette tape player 30).

On the other hand, when front panel 40 has been judged not to have stopped at step 103, it is considered that some kind of error has occurred in panel drive unit 43 and that the driving of front panel 40 has not been appropriately performed. Accordingly, in this case, microcontroller 51 proceeds to step 105, and at this step 105 an error signal is output and the error in panel drive unit 43 is displayed on display 54.

At step 104 in FIG. 9, when the instruction signal has been judged to be a disk instruction relating to CD player 20, microcontroller 51 proceeds to step 106 shown in FIG. 10 via link A, and operations to control front panel 40 for CD player 20 are performed by the operations in steps 106 through 113 for controlling the front panel for CD player operation.

At step 106, microcontroller 51 judges whether or not front panel 40 is in first open position $P_1$. Note that this judgement of the position of front panel 40 is performed at this step 106 and at every step relating to judgement of the position of front panel 40 mentioned in the following, based on detection signals from the abovementioned limit switches 70a and 70b, photoswitch 73, and other panel position detection sensors 46.

Then, at step 106, when front panel 40 is judged to be in first open position $P_1$, microcontroller 51 proceeds to step 112 and holds front panel 40 in first open position $P_1$ by stopping panel drive motor 45 of panel drive unit 43. That is, when an eject and loading instruction is issued to the disk, front panel 40 is kept in its present position if front panel 40 is already in a first open position $P_1$.

On the other hand, at step 106, when it is judged that front panel 40 is not in first open position $P_1$, microcontroller 51 determines at the following step 107 whether or not front panel 40 is in a second open position $P_2$. That is, when an eject/loading instruction is issued to the disk, front panel 40 is also left in its position when front panel 40 is already in second open position $P_2$.

At step 107, when it is judged that front panel 40 is in second open position $P_2$, microcontroller 51 proceeds to step 113 and front panel 40 is held in second open position $P_2$ by stopping panel drive motor 45 of panel drive unit 43. Conversely, at step 107, when it is judged that front panel 40 is not in second open position $P_2$, microcontroller 51 determines at the following step 108 whether or not the front panel 40 is in closed position $P_0$.

At step 108, when front panel 40 is judged not to be in a closed position $P_0$, it is considered that front panel 40 is stationary at a position other than the 3 specified positions $P_0$, $P_1$ and $P_2$, and that some kind of error has occurred in panel drive unit 43. Accordingly, in this case, microcontroller 51 proceeds to step 105 in FIG. 9 via link C, and at this step 105 an error signal is output and the error in panel drive unit 43 is displayed on display 54. Note that it is also possible to omit this step 108 and go directly to step 109 when a negative response is obtained at step 107.

Conversely, at step 108, when it is judged that front panel 40 is in closed position $P_0$, it is considered that the driving of front panel 40 has been appropriately performed. Accordingly, in this case microcontroller 51 proceeds to the following step 109, panel drive motor 45 is driven forward by applying a control signal to panel drive unit 43, and front panel 40 is swivelled in first direction $D_1$ by panel drive mechanism 44. At the following step 110, microcontroller 51 stands by for a specific time period according to the time required from the time when the control signal is output to panel drive unit 43 until the time when the detection signal of first open position $P_1$ is input. After standing by, microcontroller 51 judges whether or not front panel 40 has arrived at first open position $P_1$ at step 111.

At step 111, when it is judged that front panel 40 has not arrived at first open position $P_1$, it is considered that the driving of front panel 40 has not been appropriately performed and that some kind of error has occurred in panel drive unit 43. Accordingly, in this case, microcontroller 51 proceeds to step 105 in FIG. 9 via link C, and at this step 105 it outputs an error signal, and the error in panel drive unit 43 is displayed on display 54.

On the other hand, at step 111, when it is judged that front panel 40 has arrived at first open position $P_1$, it is considered that the driving of front panel 40 has been appropriately performed. Accordingly, microcontroller 51 proceeds to the following step 112 when it is judged in this way at step 111 that front panel 40 has arrived at first open position $P_1$, and front panel 40 is held at first open position P1 by stopping panel drive motor 45.

As a result of the control operations of front panel 40 for CD player 20 as described above, when front panel 40 is held at first or second open position $P_1$ or $P_2$ (step 112 or step 113), media insertion slot 21 of CD player 20 is in a released state, and it is possible for CD player 20 to perform ejecting and loading. Thereafter at step 114, microcontroller 51 either starts drive motor 23 of CD player 20 or causes it to stand by, and as a result disk eject/loading mechanism 22 of CD player 20 either performs an eject operation or stands by for loading.

At step 104 in FIG. 9, when the instruction signal is not a disk signal relating to CD player 20, and is accordingly judged to be a cassette instruction relating to cassette tape player 30, microcontroller 51 proceeds to step 115 shown in FIG. 11 via link B, and the control operation of front panel 40 for cassette tape player 30 is performed by the operations of steps 115 through 121.

At step 115, microcontroller 51 determines whether or not front panel 40 is in second open position $P_2$. At step 115, when it is judged that front panel 40 is in a second open position $P_2$, microcontroller 51 holds front panel 40 in the second open position $P_2$ by stopping panel drive motor 45 of panel drive unit 43. Conversely, at step 115, when it is judged that front panel 40 is not at second open position $P_2$, microcontroller 51 proceeds to step 121 and judges whether or not front panel 40 is at first open position $P_1$ at the following step 116.

At step 116, when it is judged that front panel 40 is not at first open position $P_1$, microcontroller 51 proceeds to the following step 117 and judges whether or not front panel 40 is at closed position $P_0$. At step 117, when it is judged that front panel 40 is not at closed position $P_0$, it is considered that front panel 40 has stopped at a position other than the 3 specific positions $P_0$, $P_1$ and $P_2$, and that some kind of error has occurred in panel drive unit 43. Accordingly, in this case, microcontroller 51 proceeds to step 105 in FIG. 9 via link D, an at this step 105, it outputs an error signal and the error in panel drive unit 43 is displayed on display 54.

Conversely, at step 116, when it is judged that front panel 40 is in a first open position $P_1$, or alternatively at step 117, when it is determined that front panel 40 is in a closed position $P_0$, microcontroller 51 proceeds to the following step 118, reverses panel drive motor 45 by applying a control signal to panel drive unit 43, and swivels front panel 40 in second direction $D_2$ by panel drive mechanism 44. At the following step 119, microcontroller 51 stands by for a specific period according to the required time from when the control signal is output to panel drive unit 43 to the time when the detection signal of open position $P_2$ is input. After standing by, microcontroller 51 determines whether or not front panel 40 has arranged at second open position $P_2$ at step 120.

At step 120, when it is judged that front panel 40 has not arrived at second open position $P_2$, it is considered that the driving of front panel 40 has not been appropriately performed, and that some kind of error has occurred in the panel drive unit 43. Accordingly, in this case, microcontroller 51 proceeds to step 105 in FIG. 9 via link D, and at this step 105, it outputs an error signal and the error in panel drive unit 43 is displayed on display 54.

Conversely, at step 120, when it is judged that front panel 40 has arrived at second open position $P_2$, it is considered that the driving of front panel 40 has been appropriately performed. Accordingly, when microcontroller 51 has judged at step 120 that front panel 40 has arrived at second open position $P_2$, it proceeds to the following step 121 where front panel 40 is held at second open position $P_2$ by stopping panel drive motor 45.

As a result of the control operations of front panel 40 for cassette tape player 30 as mentioned above, when front panel 40 is held at second open position $P_2$ (step 121), media insertion slot 21 of CD player 20 and media insertion slot 31 of cassette tape player 30 are both released, and it is possible for cassette tape player 30 to perform ejecting and loading. Thereafter, at step 122, microcontroller 51 controls drive motor 33 of cassette tape player 30, and as a result cassette ejectloading mechanism 32 of cassette tape player 30 either performs an eject operation or stands by for loading.

As shown in FIG. 5 and FIG. 6, when panel drive unit 43 of the present embodiment is in the closed state, slide member 60 is in a neutral position to the front of the center of the operating range from front to back. In this case, operating tabs 72a and 72b provided on rib 60a of slide member 60 are positioned away from actuators 71a and 71b of limit switches 70a and 70b, and the perforated line provided on rib 60b of slide member 60 overlaps with photoswitch 73 at its end. Also, drive pins 63 provided on both sides of front panel 40 in closed position $D_0$ are in a neutral position to the front of the center of the operating range from front to back, and follower pins 66 are at the top end of guide slots 68.

From this closed state, panel drive unit 43 operates as follows when panel drive motor 45 is driven forward or backward by microcontroller 51 as mentioned above to eject/load disk 2 or cassette 3.

First, when panel drive motor 45 is driven forward by microcontroller 51 from the closed state shown in FIG. 6, slide member 60 is driven by the forward driving force of panel drive motor 45 via gear train 62 and rack 61. In this case, slide member 60 is guided by its guide slots 64 and guide pins 65 on the side of chassis 11, and moves horizontally forward from the neutral position to the front of the center as shown in FIG. 6.

Then, as this slide member 60 moves forward, drive pins 63 of front panel 40, which is supported by the end part of this slide member 60, move horizontally forward from the neutral position to the front of the center, and the bottom part of front panel 40 moves forward. Furthermore, as this front panel 40 moves, follower pins 66 of front panel 40 move down from the top part of guide slots 68, and the top part of front panel 40 moves down. Accordingly, as shown in FIG. 7, front panel 40 swivels in first direction $D_1$ with liquid crystal TV 41 in its front part pointing up.

Also, as slide member 60 moves forward, photoswitch 73 counts the holes in perforated line 74 by moving relatively to the back end from the front end of perforated line 74 provided on rib 60b of slide member 60; when it has arrived at an arbitrarily set count value, panel drive motor 45 is stopped and a detection signal for first open position $P_1$ is output and sent to microcontroller 51 of operating/control unit 50. As a result, slide member 60 stops and front panel 40 stops at first open position $P_1$ shown in FIG. 7. Note that first open position $P_1$ of front panel 40 is adjustable between closed position $P_0$ and the limit of the swivel range in first direction $D_1$ as mentioned above, but when it is set at the limit of the swivel range in first direction $D_1$, since actuator 70a of rear limit switch 70a is pressed down by rear operating tab 72a provided on rib 60a on slide member 60 as shown in FIG. 7, panel drive motor 45 is stopped by operating this rear limit switch 70a, and a detection signal for first open position $P_1$ is output.

Next, when panel drive motor 45 is started in reverse by microcontroller 51 from the closed state shown in FIG. 6, slide member 60 is driven by the reverse driving force of panel drive motor 45, and as shown in FIG. 6, this slide member 60 moves horizontally to the rear from the neutral position to the front of the center.

Then, as this slide member 60 moves to the rear, drive pins 63 move horizontally to the rear from the neutral position to the front of the center, and the bottom part of front panel 40 moves to the rear. Furthermore, as front panel 40 moves in this way, follower pins 66 of front panel 40 move down from the top end of guide slots 68, and the top part of front panel 40 moves down. Accordingly, as shown in FIG. 8, front panel 40 swivels in second direction $D_2$ with liquid crystal TV 41 on its front part pointing down, and its bottom part is retracted inside chassis 11 of device main unit 10.

Also, as slide member 60 moves to the rear, the front operating tab 72b provided on rib 60a of this slide member 60 also moves to the rear, but when front panel 40 has arrived at second open position $P_2$, actuator 71b of front limit switch 70b is pressed down by this front operating tab 72b, and thus panel drive motor 45 is stopped by operating this front limit switch 70b, and a detection signal for second open position $P_2$ is output.

Furthermore, from the first and second open states shown in FIG. 7 and FIG. 8, the operation to return to the closed state shown in FIG. 6 is performed by turning panel drive motor 45 in the opposite direction to when it was released, and front panel 40 is swivelled in the reverse direction to when it was released. In both of the return operations, front panel 40 arrives at closed position $P_0$ shown in FIG. 6 as slide member 60 moves, and when the end of perforated line 74 provided on rib 60b of slide member 60 overlaps photoswitch 73, panel drive motor 45 is stopped by operating photoswitch 73, and a detection signal for closed position $P_0$ is output.

From the above, with the automotive data device according to the present embodiment, front panel 40 is basically swivelled to first open position $P_1$ with its front part facing up when ejecting or loading disk 2 in the upper CD player 20. Thus, passengers of the vehicle can continue to view and operate liquid crystal TV 41 and user operating switches 42 provided at the front part of this front panel 40 in the same way as in closed position $P_0$.

Moreover, in this first open position $P_0$, front panel 40 is only swivelled by the minimum amount necessary to release media insertion slot 21 of CD player 20. Thus, compared with the case where media insertions slots 21 and 31 of CD player and cassette tape player 30 are both released, it is possible to greatly reduce the amount of swivel and the amount of projection of front panel 40.

In particular, since media insertion slot 21 of CD player 20 (which is used for relatively thin data recording media) is thinner than media insertion slot 31 of cassette tape player 30, the amount of swivel of front panel 40 can be effectively reduced in the present embodiment where CD player 20 is situated at the top, compared with the case where cassette tape player 30 is.

Then, since it is possible to reduce the amount of swivel and the amount of projection of front panel 40 in this way, it is possible to reduce the time required for ejecting and loading disk 2 in CD player 20. Additionally, it is possible to prevent contact between front panel 40 and disk 2 and to prevent damage resulting therefrom, and it is also possible to increase the installable range of the device.

Also, when ejecting/loading disk 2 from/into upper CD player 20, in the case where front panel 40 is already in second open position $P_2$, front panel 40 is held in this second open position $P_2$ without unnecessary swivelling of front panel 40, and thus it is possible to eject/load disk 2 in CD player 20 immediately and effectively.

On the other hand, when ejecting/loading cassette 3 from to lower cassette tape player 30, front panel 40 is swivelled to second open position $P_2$ with its front part facing down. Thus, there is no possibility of cassette 3 and the front part of front panel 40 coming into contact, and there is no possibility of damaging liquid crystal TV 41 and operating switches 42 provided on the front part of this front panel 40.

In this second open position $P_2$, front panel 40 is in a configuration that projects horizontally forward, but in this case in the present embodiment, the bottom part of front panel 40 is retracted inside device main unit 10 as shown in FIG. 8 and the amount of projection of front panel 40 can thereby be reduced. It is thus possible to prevent damage to front panel 40 and to increase the installable range of the device.

As mentioned above, with the present embodiment, it is possible to view and operate operating switches 42 and liquid crystal TV 41 in the front part of front panel 40 when ejecting/loading disk 2 or cassette 3, and it is possible to prevent damage to front panel 40 and to disk 2 or cassette 3; moreover, it is possible to increase the installable range of the device by decreasing the amount of swivel and the amount of projection of front panel 40. Accordingly, it is possible to increase the convenience of use, ease of operation, and reliability, and it also has excellent flexibility of installation.

Figure 12:
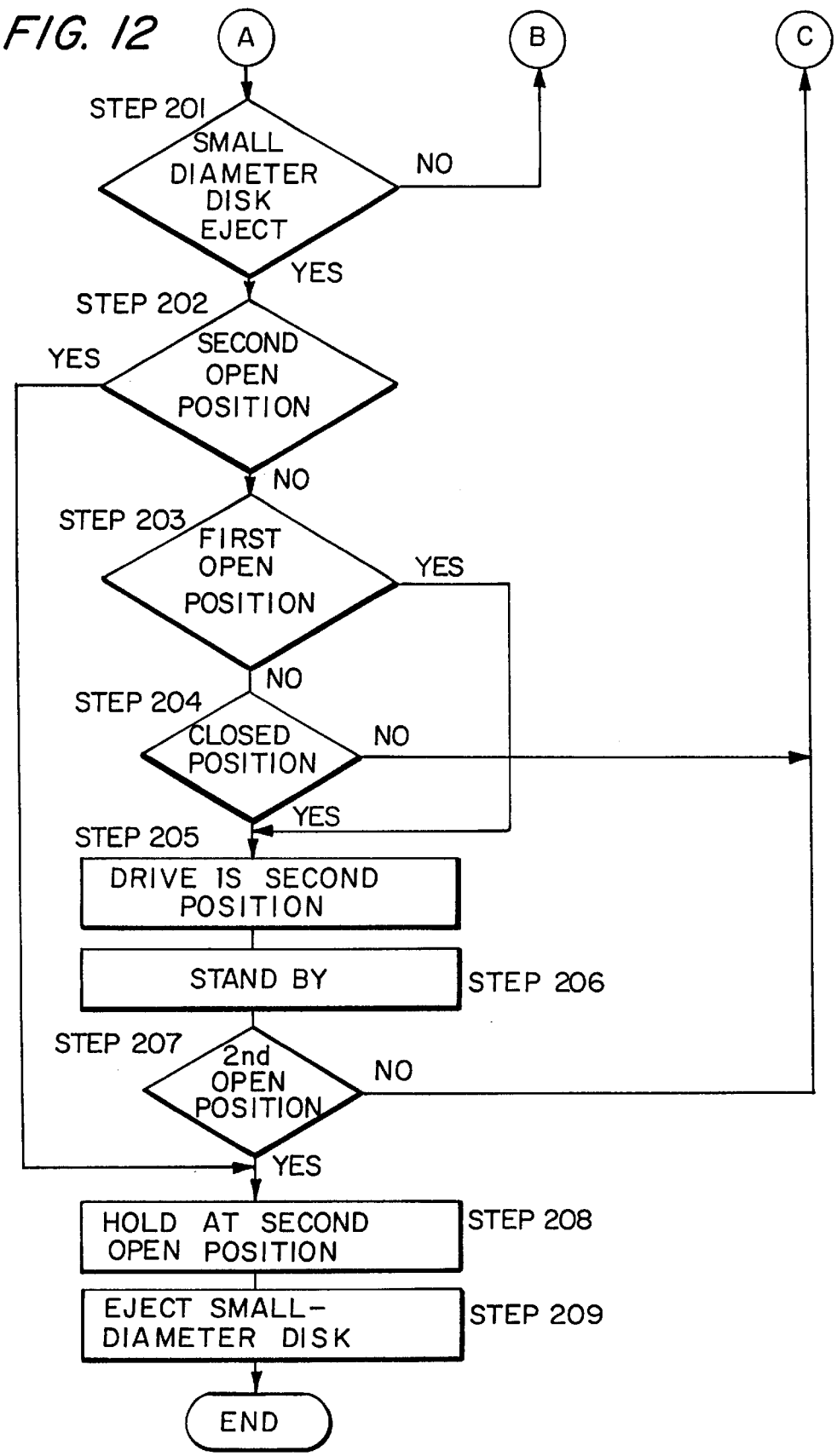
FIG. 12 is a flow chart showing part of the microcontroller operating procedure when an eject/loading instruction is received in an automotive data device according to the second embodiment of the present invention.
Figure 13:
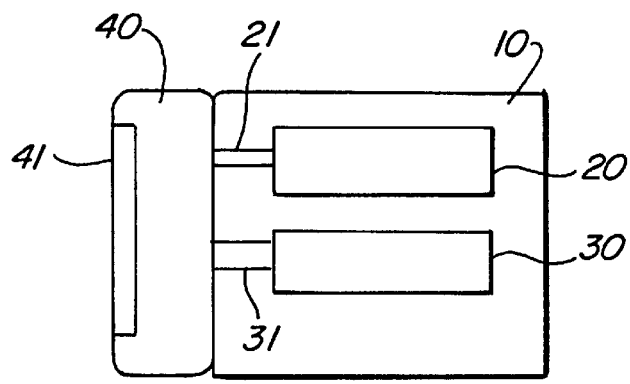
FIG. 13 is a figure showing the configuration of one example of a conventional automotive data device.
Figure 14:
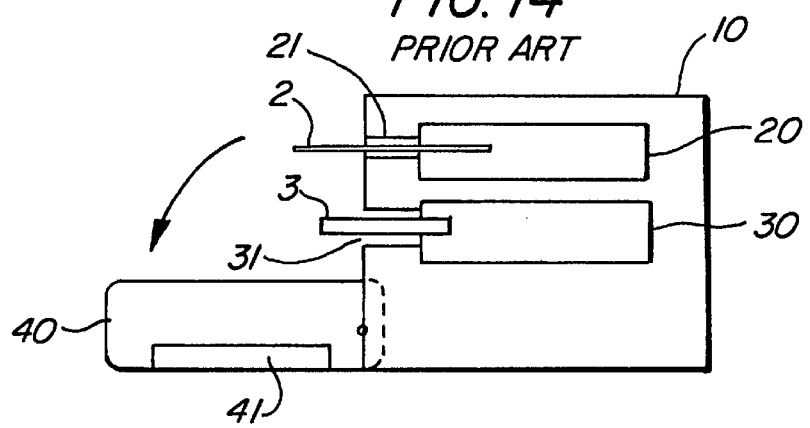
FIG. 14 is a figure showing the basic principle of one example of the front panel swivel method of a conventional automotive data device.
Figure 15:
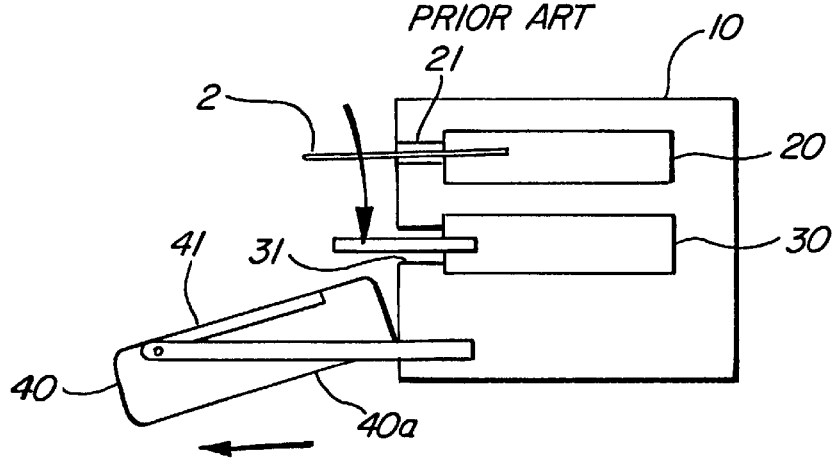
FIG. 15 is a figure showing the basic principle of another example of the front panel swivel method of a conventional automotive data device.

Whereas CD player 20 as used in the first embodiment was a CD player 20 capable of directly loading large-diameter disks (12 cm CDs) and small-diameter disks (8 cm CDs) as described above, in a second embodiment microcontroller 51 of operating/control unit 50 is especially set up to control front panel 40 during the ejection of small-sized disks so that it is performed by the operating procedure shown in FIG. 12. To be specific, steps 201 through 209 of this sequence of operations are inserted at the link A portion between step 104 shown in FIG. 9 and step 106 shown in FIG. 10. Note that the other parts are configured in the same way as in the first embodiment.

In the automotive data device according to the second embodiment, microcontroller 51 of operating/control unit 50 basically controls front panel 40 during ejecting/loading according to the procedures shown in FIGS. 9 through 11, and it performs the procedure shown in FIG. 12 only when controlling the front panel for the CD player when ejecting a small-diameter disk.

That is, at step 104 in FIG. 9, when it has determined that an instruction signal relates to CD player 20, microcontroller 51 determines at step 201 in FIG. 12 whether or not the eject/loading instruction signal that was input relates to the ejection of a small-diameter disk. Note that the size of disk 2 is determined in this case based on a detection signal from disk size discrimination sensor 26 as described in the said first embodiment.

Then, at step 201, when it is determined that the input eject loading instruction signal does not relate to the ejection of a small-diameter disk, microcontroller 51 performs the operations of steps 106 through 114 in FIG. 10 as before.

On the other hand, if it is determined at step 201 that the input eject/loading instruction signal relates to the ejection of a small-diameter disk, microcontroller 51 performs the operations of the following steps 202 through 208. Since the sequence of operations in steps 202 through 208 is exactly the same as the sequence of operations in steps 115 through 121 (FIG. 11) to control front panel 40 for the cassette tape player in the first embodiment, their description is omitted.

Next, at step 208 (which corresponds to step 121), as a result of holding front panel 40 in second open position $P_2$, media insertion slot 21 of CD player 20 and media insertion slot 31 of cassette tape player 30 are both in a released state, and CD player 20 is in a state where ejecting and loading are possible. Thereafter, at step 209, microcontroller 51 controls drive motor 23 of CD player 20 so as to turn it in the eject direction, and as a result disk eject/loading mechanism 22 of CD player 20 performs an eject operation for a small diameter disk.

With an automotive data device according to the present embodiment having the above-mentioned configuration, the following effects are also achieved in addition to the effects achieved with the said first embodiment. That is, small-diameter disks project by a small amount when ejected as mentioned above, and in particular as shown in FIG. 3 and FIG. 7, media insertion slot 21 of CD player 20 and the top part of front panel 40 are extremely close together when front panel 40 is in first open position Pi; it is thus difficult in this state to remove the small-diameter disk from media insertion slot 21. On the other hand, with the present embodiment, as regards the ejecting and loading of disk 2, since front panel 40 is held in second open position $P_2$ when a small-diameter disk is ejected, it is easy to remove the small-diameter disk without front panel 40 obstructing the removal of the small-diameter disk. Accordingly, it is possible to further increase the convenience of use and ease of operation, particularly when ejecting small-diameter disks.

The present invention is not limited to the above embodiments, and a broad diversity of other embodiments is also possible. First, the procedure whereby microcontroller 51 operates the front panel 40 in the said embodiments can be appropriately varied. For example, in the above embodiments, the operation was described wherein microcontroller 51 is set up to start control for eject/loading only when front panel 40 is stationary; however, it is not limited to this and it can also be set up to start controlling front panel 40 while front panel 40 is still operating.

For example, when an eject/loading instruction is input while front panel 40 is still moving, the swivel direction of front panel 40 is determined, and if this swivel direction is appropriate, it continues to drive front panel 40; conversely, if the swivel direction is inappropriate it can be set up to reverse the swivel direction of front panel 40 by reversing panel drive motor 45. When set up in this way, front panel 40 can be controlled faster and more flexibly.

Furthermore, the above embodiments are configured so that control is performed for the eject/loading of CD player 20 and cassette tape player 30 after the control of front panel 40 is completed, but these forms of control may also be performed at the same time. Also, the operating unit and control unit may be freely configured; for example, the above embodiments may be varied by incorporating a control means comprising microcontroller 51 and operating/control unit 50 inside device main unit 10. In this case, display 54 may be substituted by the display screen of liquid crystal TV 41.

On the other hand, the specific configuration of panel drive unit 43 for driving front panel 40 can be freely varied. For example, in the above embodiments it was configured to move slide member 60 horizontally and swivel front panel 40 by means of V shaped guide slots 68 provided on device main unit 10 via drive pins 63 and follower pins 66; however, various mechanisms can be appropriately applied wherein the horizontal driving force of slide member 60 is similarly converted into a swivel drive force so as to swivel front panel 40 in the two directions.

Also, in the above embodiments, the open positions of front panel 40 are only set to one place in each of the first and second directions; however, it is also possible to set a plurality of open positions in each of the swivel directions or to allow it to be set in a continuous range of positions during manual operation. For example, in the above embodiments a configuration is envisaged wherein front panel 40 can also be made to stop at a position where only the media insertion slot 21 of CD player 20 is released by swivelling in the second direction.

Note that in the above embodiments, cassette tape player 30 is situated at an inclined angle, but it may also be situated horizontally. Also, a configuration wherein cassette tape player is situated at the top and CD player 20 is at the bottom is also possible. Furthermore, the present invention is not limited to the combination of a CD player and a cassette tape player and may be freely assembled from any combination of various disk players such as MD players, IC card reading devices, or various recording and playback devices including DAT players, video tape players and so on, which may be situated at the top or at the bottom. It is also possible to provide various devices besides the liquid crystal TV in the front part of front panel 40.

The present invention may also be configured with a vertical arrangement of n (3 or more) recording and playback devices, in which case it is envisaged that n open positions are set up to respectively release the media insertion slots up to the nth recording and playback device from the top. For example, a configuration is envisaged whereby it swivels in a first direction when releasing only the media insertion slot of the uppermost recording and playback device, and swivels in a second direction when releasing the media insertion slots of the second and subsequent recording and playback devices from the top. It can also be configured so as to release the media insertion slots of a plurality of recording and playback devices by swivelling in the first direction.

As described above, the present invention is configured so that front panel 2 is swivelled in two directions and each of the media insertion slots is released by swivelling in these directions, and is also configured so that this swivelling of the front panel is controlled according to attachment/release instructions to the recording and playback devices; compared with the prior art, it thereby enables the front part of the front panel to be viewed and operated when data recording media are ejected inserted, and can prevent damage to the front panel and to the data recording media; moreover, it can increase the installable range of the device by decreasing the amount of swivel and the amount of projection of the front panel. Accordingly, it is possible to provide an automotive data device with superior convenience of use, ease of operation, reliability, and flexibility of installation.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An audio player for an automobile comprising:

a housing member;

a first player unit mounted in the housing member for playing a first audio recording media, the first player unit has a first insertion slot on one side of the housing member for insertion and extraction of a first audio recording media;

a second player unit mounted in the housing media, adjacent the first player unit, for playing a second audio recording media of a different size from the first audio recording media, the second player unit has a second insertion slot on the same side of the housing member as the first insertion slot;

a movable operating panel for controlling the respective first player unit and second player unit to extend across the first and second insertion slots;

a panel drive motor and linkage assembly is connected to the operating panel for moving the operating panel relative to the housing member and includes a slide member pivotally connected to the movable operating panel and a guide slot and guide pin operatively connected between the operating panel and the housing member, the slide member is driven to reciprocate in a linear direction into and out of the housing member to move the operating panel, wherein an initial movement of the slide member out of the housing member rotates and tilts the operating panel towards the housing member to expose the first insertion slot, while a retraction movement of the slide member rotates the operating panel about the guide pin and causes the slide member to be retracted within the housing member; and a control unit for driving the panel drive motor in a first mode of operation to move the operating panel to expose only the first insertion slot and a second mode of operation to further move the operating panel to expose both the first insertion slot and the second insertion slot, while retracting at least a portion of the operating panel into the housing member below the second insertion slot.

2. The invention of claim 1, wherein the operating panel includes user controls, and the user controls are rotated away from the second insertion slot in the second mode of operation.

3. The invention of claim 1, wherein the control unit positions the movable operating panel downward and inward from its initial position across the first and second insertion slots in the first mode of operation in order to permit operating panel controls to be used.

4. An automotive data device, comprising:

a device main unit;

a plurality of recording and playback means vertically stacked inside side main unit;

a plurality of media insertion slots provided for said plurality of recording and playback means, and which are respectively formed in the front of said device main unit for receiving media;

a front panel provided at the front of said device unit having an outer front part so as to cover said plurality of media insertion slots;

a swivel means for moving said front panel so that said front panel releases said plurality of media insertion slots, said swivel means is configured so as to swivel said front panel in a first direction with its front part pointing up, and in a second direction with its front part pointing down, respectively, and includes a slide member that is driven to reciprocate in a linear direction into and out of the device main unit, wherein the front panel is pivotally connected adjacent a bottom portion to the slide member and a side of the front panel and includes a guide slot, a guide pin fixed to the device main unit and extends into the guide slot to move the front panel in the respective first and second direction when the slide member is moved wherein an initial movement of the slide member out of the device main unit rotates and tilts the front panel towards the device main unit to expose an upper insertion slot, while a retraction movement of the slide member rotates the front panel about the guide pin and moves the pivotal connection of the bottom portion of the front panel into the device main unit; and a control means that controls the staring and stopping of said swivel means, the control means swivels said front panel in said first direction by starting said swivel means when an instruction for an attachment/removal of media is issued to a recording and playback means at the top of said plurality of recording and playback means, and so as to swivel said front panel in said second direction by starting said swivel means when an instruction for the attachment/removal of media is issued to a recording and playback means at the bottom of said plurality of recording and playback means.

5. The automotive data device as claimed in claim 4, wherein said swivel means is configured so that when it swivels said front panel in said first direction, it pulls down a top end of this front panel to a position below at least one media insertion slot of said plurality of media insertion slots and above at least one media insertion slot, and when it swivels this front panel in said second direction, it drops a back part of this front panel to a position below the lowermost media insertion slot of said plurality of media insertion slots.

6. The automotive data device as claimed in claim 5 characterized in that said control means is configured so as to hold said front panel in the swivelled state of said second direction without starting said swivel means when an instruction for the attachment/removal of media is issued to a recording and playback means at the top of said plurality of recording playback means in the state where said front panel is swivelled in said second direction.

7. The automotive data device as claimed in claim 5, wherein said swivel means is configured so as to retract the bottom part of this front panel inside said device main unit when said front panel is switched in said second direction.

8. The automotive data device as claimed in claim 5 characterized in that said control means is configured so as to hold said front panel in the swivelled state of said second direction without starting said swivel means when an instruction for the attachment/removal of media is issued to a recording and playback means at the top of said plurality of recording playback means in the state where said front panel is swivelled in said second direction.

9. The automotive data device as claimed in claim 4 characterized in that said control means is configured so as to hold said front panel in the swivelled state of said second direction without starting said swivel means when an instruction for the attachment/removal of media is issued to a recording and playback means at the top of said plurality of recording playback means in the state where said front panel is swivelled in said second direction.

10. The automotive data device as claimed in claim 4, where said plurality of recording an playback means includes a disk player situated at the top.

11. The automotive data device as claimed in claim 4, wherein said audio player is configured to allow the insertion of two types of disk having large and small diameters; said control means is configured so as to swivel said front panel in said second direction by starting said swivel means when, in the state where a small-diameter disk is inserted in said disk player, an instruction is issued to eject this disk.

12. The automotive data device as claimed in claim 4, wherein said swivel means is configured so as to retract the bottom part of this front panel inside said device main unit when said front panel is switched in said second direction.

13. The automotive data device as claimed in claim 4, wherein an upper recording and playback means plays recording media of a thin configuration and a lower recording and playback means plays recording media of a relatively thicker configuration and the lower recording and playback means insertion slot is tilted upward relative to the upper recording and playback means insertion slot.

14. The automotive data device as claimed in claim 4, wherein the front panel has an inner rear part with an upper and lower slanted surfaces.

* * * * *